US006004666A

United States Patent [19]

Hörnig et al.

[11] Patent Number: 6,004,666

[45] Date of Patent: Dec. 21, 1999

[54] DATA CARRIER HAVING ENCAPSULATED SCENTS AND A METHOD FOR PRODUCING IT

[76] Inventors: Monika Hörnig, Hans-Mielich-Str. 1, D-81543 Munich; Herbert Grün, Wallbergstrasse 4, 85586 Poing, both of Germany

[21] Appl. No.: 08/623,308

[22] Filed: Mar. 28, 1996

[30] Foreign Application Priority Data

Mar. 30, 1995 [DE] Germany .......................... 195 11 780

[51] Int. Cl.[6] ........................................ B32B 3/26

[52] U.S. Cl. .................. 428/321.5; 428/402; 428/402.2; 428/411.1; 283/56

[58] Field of Search .............................. 156/200; 283/56; 428/201, 204, 206, 411.1, 195, 913, 402, 402.2, 321.5

[56] References Cited

U.S. PATENT DOCUMENTS

| | | | |
|---|---|---|---|
| 4,880,851 | 11/1989 | Yamamoto | 523/102 |
| 4,882,220 | 11/1989 | One et al. | 428/240 |
| 4,980,392 | 12/1990 | Yamamoto | 523/102 |
| 4,987,161 | 1/1991 | Yamamoto | 523/102 |
| 4,988,744 | 1/1991 | Yamamoto | 523/102 |
| 5,075,350 | 12/1991 | Yamamoto | 523/102 |
| 5,387,622 | 2/1995 | Yamamoto | 523/102 |

FOREIGN PATENT DOCUMENTS

| | | |
|---|---|---|
| 0 281 034 | 9/1988 | European Pat. Off. . |
| 0 473 798 | 11/1992 | European Pat. Off. . |

*Primary Examiner*—Elizabeth Evans

[57] ABSTRACT

The invention relates to a data carrier (1) having microencapsulated scents and to a method for producing it. The data carrier (1), which is generally made of an unabsorptive material, is in particular a telephone card, identity card or the like. The microencapsulated scents are applied to the data carrier (1) with a coating material in a mixture ratio or layer thickness such that at least some of the microcapsules (4) are accessible on the surface of the coating. After being applied to the data carrier (1) the coating material hardens by polymerization or another chemical reaction. The coating material is applied as a priming layer (5) or/and as an information layer (2) or/and as a transparent cover layer. Application takes place on one or both sides of the data carrier (1) over part of the area or all over.

17 Claims, 2 Drawing Sheets

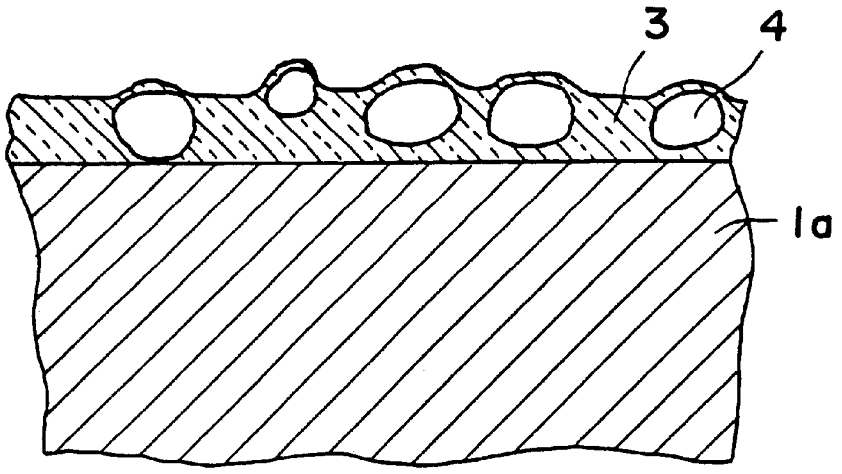
F/G. 4
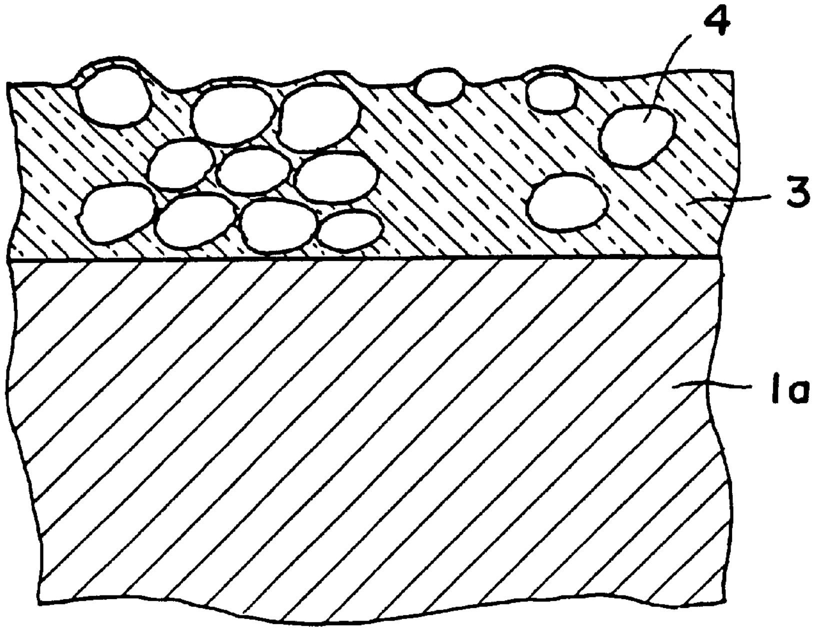
F/G. 5

DATA CARRIER HAVING ENCAPSULATED SCENTS AND A METHOD FOR PRODUCING IT

BACKGROUND OF THE INVENTION

A) Field of the Invention

This invention relates to a data carrier having encapsulated scents and to a method for producing such a data carrier.

B) Related Technology

Data carriers having encapsulated scents are known which are used in particular for advertising purposes. In known data carriers the carrier material used is paper which is printed with inks containing scents enclosed in microcapsules. The inks used generally contain not only the microcapsules but also dyes or pigments, binders and solvents.

In the production of known data carriers the ink, after being printed on the paper base, dries by absorption in the data carrier and evaporation of the solvent. The dyes or pigments are largely fixed on the paper surface with the help of the binder. Evaporation of the solvent and absorption of the binder reduce the volume of applied ink so much that the microcapsules admixed to the ink are in any case accessible on the paper surface. If one rubs the surface of a data carrier thus printed, some of the microcapsules accessible on the paper surface are destroyed, thereby releasing the scents contained therein.

The known method for applying encapsulated scents provides satisfactory results but was restricted up to now to absorptive surfaces, i.e. surfaces on which an applied ink dries quickly by absorption. It was evidently assumed up to now that this method cannot be used if the microcapsules are applied to an unabsorptive base since the microcapsules are then too greatly embedded in the binder or enveloped thereby and fail to release the scent even after being destroyed. The invention is based on the problem of extending the range of application of microencapsulated scents in data carriers.

BRIEF SUMMARY OF THE INVENTION

The invention is based on the finding that microcapsules can be admixed to inks, lacquers or the like and applied to unabsorptive surfaces if the microcapsules are applied with the inks, lacquers, etc., in a mixture ratio or layer thickness such that at least some of the microcapsules are necessarily accessible on the surface of the coating despite the unabsorptive surface. This is obtained according to the invention e.g. by applying the coating so thinly that the microcapsules contained in the coating protrude out of the coating.

The advantages obtained by the invention are in particular that microencapsulated scents can also be applied to data carriers made of unabsorptive material. One can select as coating materials to which the microcapsules are admixed the almost solventless coating materials usual for data carriers with unabsorptive surfaces, since the microcapsules are made accessible according to the invention by the choice of mixture ratio or layer thickness and not by absorption or evaporation of a binder or solvent. The structure of the data carriers and the method for producing them can thus be largely retained.

According to a preferred embodiment of the invention the coating material is applied as a transparent cover layer over a large area of the data carrier. This means that the entire available surface or large areas thereof can be utilized for applying the encapsulated scents. Furthermore the optimization of the coating material composition necessitated by the addition of encapsulated scents must only be performed once for this transparent coating material. The composition of the inks used for representing information on the data carrier can be retained unchanged.

If a transparent cover layer is undesirable, it is also possible to use the coating material with the added encapsulated scents for producing the information layer. In this case one uses a colored coating material or several colored coating materials.

It is especially suitable within the framework of the invention to use coating materials which harden by polymerization, the polymerization being promoted by irradiation, in particular irradiation with ultraviolet light. If such coating materials are used the curing process can be controlled very well. However one must make sure the irradiation does not last too long since otherwise the scents might be released prematurely, probably due to the heat arising during irradiation. Using these coating materials curing by polymerization, especially good results have been achieved with a UV-curing lacquer to which approx. 20% by weight of encapsulated scents is added. The optimal mixture ratio can vary depending on the coating material.

For applying the coating material provided with encapsulated scents it is especially suitable to use printing processes, in particular offset printing processes. They permit very thin layers to be applied which provide very good results with respect to accessibility of the microcapsules. When printing the data carriers, however, one must make sure the application force is not selected too great so as not to destroy the microcapsules enclosing the scents. One must also heed this when selecting other methods for applying the coating material containing the encapsulated scents. Altogether the production process should take place as gently as possible with regard to the encapsulated scents.

BRIEF DESCRIPTION OF THE DRAWINGS

The invention will be explained in the following with reference to the embodiments shown in the figures, in which:

FIG. 4 shows a greatly enlarged detail of a cross section through the data carrier on which a very thin layer of microcapsule-bearing coating material is applied, FIG. 5 shows a greatly enlarged detail of a cross section through the data carrier, the applied layer of microcapsule-bearing coating material being thicker than in FIG. 4.

DETAILED DESCRIPTION

Figure 1:
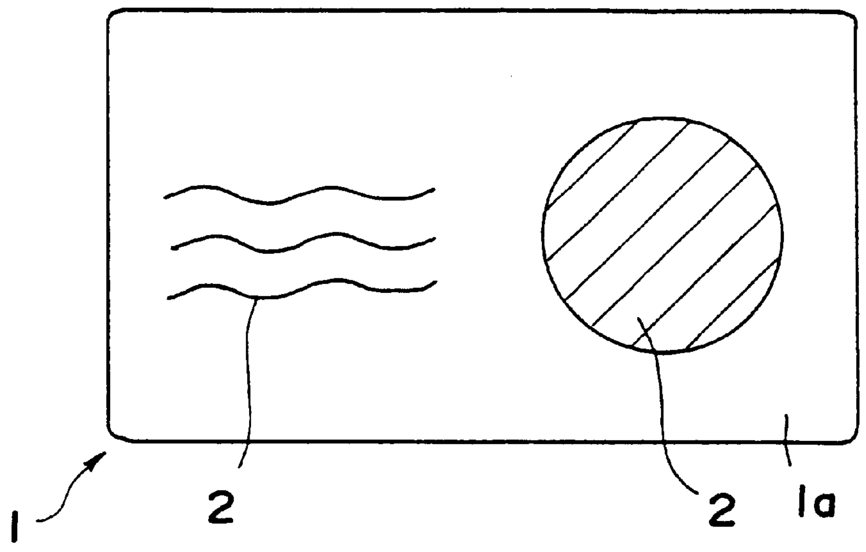
FIG. 1 shows a coated data carrier in plan view.

FIG. 1 shows coated data carrier 1 in plan view. This data carrier can be for example a telephone card, identity card or the like. Data carrier 1 is generally made of a substrate 1*a* formed of an unabsorptive material, for example plastic. Data carrier 1 bears printed information layer 2. Information layer 2 can represent for example writing or graphic information. In telephone cards information layer 2 frequently represents advertising information. In identity cards information layer 2 generally represents personal data and optionally a photo of the card owner.

Figure 2:
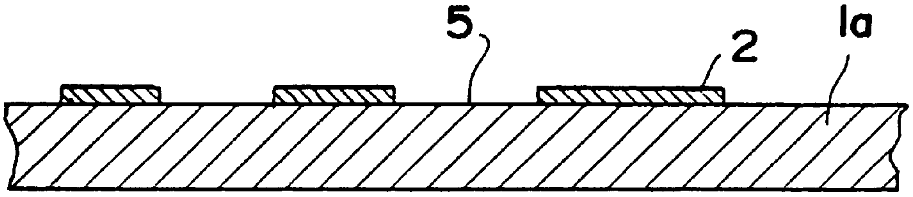
FIG. 2 shows a cross section through the coated data carrier in which the sequence of layers can be recognized.

FIG. 2 shows a cross section through coated data carrier 1 so that the sequence of layers is visible. Information layer 2 can be applied either directly on the surface of data substrate 1*a* or on a priming layer 5 covering the surface of the substrate. Priming layer 5 can serve to seal the surface or form a well-adhering base for information layer 2. The priming layer is optional, and can be omitted depending on the application of data carrier 1 and the material of which substrate 1*a* or information layer 2 is made. In the embodiment shown in FIG. 2 the encapsulated scents are contained in information layer 2 applied to substrate 1*a* of data carrier 1 or in priming layer 5 or else in both layers. Information layer 2 can cover part of the surface of data carrier 1, as shown in FIG. 2. However information layer 2 can also cover data carrier 1 all over. All-over information layer 2 can represent information for example by using different colors. Information layer 2 and priming layer 5 can be applied either on only one side of data carrier 1 or on both sides of data carrier 1. In addition to the elements shown in FIGS. 1 and 2 a number of further elements can be present on, or in, data carrier 1, for example a magnetic stripe, an electronic module for contacting or noncontacting data exchange, laser inscriptions, embossings, watermarks and many other things.

Figure 3:
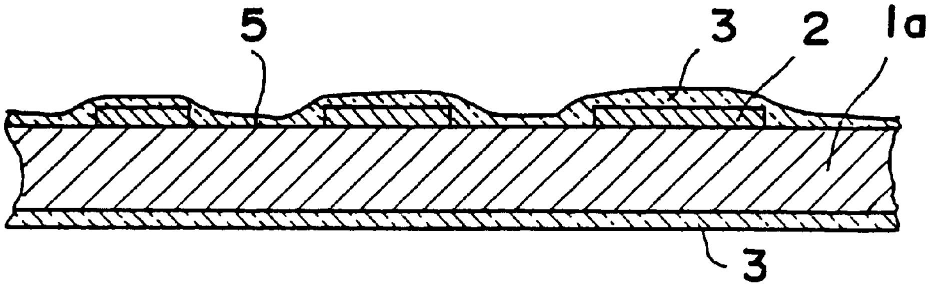
FIG. 3 shows a cross section through the coated data carrier with a different sequence of layers.

FIG. 3 shows a cross section through coated data carrier 1 with a different sequence of layers as shown in FIG. 2. In the embodiment shown in FIG. 3 transparent solid cover layer 3 covers substrate 1*a* along with information layer 2. This covering can be provided partially or all over. A priming layer 5 is again optional. In this embodiment the encapsulated scents are generally contained not in information layer 2 but in transparent cover layer 3. However variants are also possible in which the encapsulated scents are contained in information layer 2 or in priming layer 5. Furthermore the encapsulated scents can also be contained in several of the three layers (priming layer 5, information layer 2 and transparent cover layer 3). Information layer 2 and transparent cover layer 3 as well as priming layer 5 can be applied either on one side or on both sides of substrate 1*a* data carrier 1. As described in the text on FIG. 2, data carrier 1 can contain a number of further elements not shown in the figure.

All embodiments have in common that the encapsulated scents are partly released from the microcapsules if one rubs or presses on coated data carrier 1. Release takes place by some of the microcapsules which enclose the scents being destroyed and the high-volatile scents thereby escaping. To permit the scents to escape into the ambient air, the microcapsules 4 must not be covered by a layer impervious to the scents. Furthermore it must be guaranteed that the microcapsules can be destroyed by mechanical forces such as rubbing or pressure. In other words, the microcapsules must not be embedded in such a way as to be protected from destruction by rubbing or pressure. Furthermore a sufficient number of microcapsules must be present so that the scents can be released in a quantity which is clearly perceptible. The requirements for later release of the scents as outlined here can be ensured by various measures, which can also be combined with each other. These measures will be explained with reference to FIG. 4 and FIG. 5.

FIG. 4 shows a greatly enlarged detail of a cross section through data carrier 1 on which very thin layer 3 of microcapsule-bearing coating material is applied. Layer 3 is so thin that microcapsules 4 protrude from layer 3 and are thus readily accessible at the surface of the coating layer 3. Such thin layers can be applied for example by offset printing. FIG. 4 shows clearly that a suitable choice of the coating material layer thickness can ensure that the scent contained in microcapsules 4 can be released into the environment upon destruction (i.e., fracturing) of microcapsules 4.

FIG. 5 shows a greatly enlarged detail of a cross section through subtrate 1*a* of data carrier 1, applied layer 3 of microcapsule-bearing coating material being thicker than in FIG. 4. In contrast to FIG. 4 a number of microcapsules 4 are completely embedded in layer 3 in FIG. 5. Suitable choice of the mixture ratio in which microcapsules 4 are admixed to the coating material can nevertheless ensure that microcapsules 4 are disposed on, or near, the surface of layer 3 in a sufficient number and are thus readily accessible. In corresponding tests an addition of approx. 20% by weight of microcapsules 4 to a conventional UV-curing lacquer yielded good results.

FIGS. 4 and 5 show by way of example microcapsules 4 contained in layer 3, and one can see an area of the data carrier in which layer 3 is applied directly to data carrier 1. As explained above, microcapsules 4 can also be contained in priming layer 5 or in information layer 2, and the microcapsule-bearing layer does not have to be applied directly to the surface of data carrier 1 but can also form a second or third layer for example.

When producing data carriers 1 with microencapsulated scents, and in particular with regard to the materials used for production, one must heed a number of conditions. According to the invention the microencapsulated scents are added to a coating material which hardens by polymerization or other chemical processes without any need for an absorptive base. The preferred embodiment uses a transparent coating material whose curing is promoted by irradiation with ultraviolet light. Microcapsules 4 are added to this coating material in a mixture ratio of approx. 20% by weight and carefully mixed therewith. When mixing, one must make sure as little pressure as possible is exerted on microcapsules 4 so that they are not already destroyed during the production process.

Microcapsules 4 can also be admixed to a colored coating material which forms information layer 2 or to a coating material which forms priming layer 5.

After microcapsules 4 are added the coating material—whether transparent or colored—is applied to data carrier 1. The coating material is generally applied to sheets or webs of plastic from which data carriers 1 are separated later. For application one can use offset printing for example, which produces especially thin layers, or one can also doctor on the coating material. One must thereby make sure, as in other methods, that the application force is not selected so high that microcapsules 4 are destroyed. One expediently obtains this by initially increasing the application force so high that scents are released in a test run, and not exceeding the pressure limit thus determined minus a safety interval during application in series. The materials preferably used for data carrier 1 are webs or sheets which have a certain surface roughness, generally 12±2 microns. With such materials microcapsules 4 can be embedded completely or partly in the surface structure depending on their size. This largely protects the microcapsules from being destroyed by excessive application force when being applied and being overprinted with other layers. Later release of the scents is nevertheless possible since the surface structure of the sheets or webs is deformable by pressure and microcapsules 4 can thereby be burst. By suitably selecting the surface roughness, the deformability of the surface structure and the size of microcapsules 4 one can vary the amount of scent released by a certain action of pressure. An especially suitable method for applying the coating material containing microcapsules 4 is waterless offset printing. This printing process is very similar to conventional offset printing, but uses special siliconized printing plates.

Printed data carriers 1 are exposed to irradiation with ultraviolet light to harden the printed coating material. The maximum admissible exposure time, like the application force, should expediently be determined beforehand in a test run and necessarily maintained during the series run so that microcapsules 4 are not destroyed prematurely. As an alternative to ultraviolet light curing one can also cure by infrared light or by electron radiation, whereby a coating system suitable for the particular type of curing must be used.

It is also possible to separate the application of microcapsules 4 and the production of data carriers 1 in terms of process engineering. For this purpose one uses webs or sheets already coated with microcapsules 4. These webs or sheets are fed to data carriers 1 for further processing, whereby further layers are applied for example. For this production method it is suitable in particular to use webs or sheets with microcapsules 4 embedded in the surface structure, since microcapsules 4 are then largely protected from unintentional destruction, for example during transport.

In a variant, data carrier 1 is coated with at least two different microencapsulated scents. The different scents can be present in different layers (priming layer 5, information layer 2, transparent cover layer 3) or in different areas of the same layer.

We claim:

1. A scented card-like data carrier comprising:

a substrate layer having a non-absorbent surface and printed information on the substrate layer;

at least one layer of hardened coating material fixed on the non-absorbent surface at least in the area of the printed information;

fracturable microcapsules embedded in the coating material with at least some of the microcapsules accessible at the surface of the coating layer so as to be readily fracturable by mechanical force applied thereto;

said microcapsules including at least one group of microcapsules containing at least one common scent releasable upon fracturing of the microcapsules in said group.

2. The data carrier according to claim 1, wherein the substrate has a given thickness and the coating material is thinner than the substrate thickness.

3. The data carrier according to claim 1, wherein the coating material has been hardened by a procedure selected from the group consisting of polymerization and a chemical reaction.

4. The data carrier according to claim 3, wherein the selected procedure is polymerization and wherein the polymerization is promoted by irradiation for a selected time duration.

5. The data carrier according to claim 4, wherein the irradiation time duration is selected so as to avoid release of scents from the microcapsules.

6. The data carrier according to claim 1, wherein the surface of the substrate layer has a surface roughness and wherein the size of the microcapsules are selected such that some of the microcapsules are embedded at least partly in the surface roughness of the substrate.

7. The data carrier according to claim 1, wherein the coating material is selected from the group consisting of a priming layer, an information layer and a transparent cover layer.

8. The data carrier according to claim 1, wherein the coating material is applied completely over at least one side of the substrate.

9. The data carrier according to claim 1, wherein at least one second group of microcapsules containing a different common scent releasable upon fracturing of the microcapsules in the second group is provided in the hardened coating material, with the fracturable microcapsules of the second group embedded in the coating layer with some of the microcapsules of the second group accessible at the surface of the coating layer so as to be readily fracturable by mechanical force applied thereto.

10. The data carrier according to claim 1, wherein the coating layer and microcapsules are applied to the data carrier by a printing process.

11. The data carrier according to claim 10, wherein the printing process utilizes an application force during printing of the coating material that takes into account the stability and integrity of the microcapsules such that fracture of microcapsules is avoided during the printing process.

12. The data carrier according to claim 10, wherein the coating material is applied to the data carrier by waterless offset printing.

13. The data carrier according to claim 1, wherein the coating material contains approximately 20% by weight of microcapsules.

14. The data carrier according to claim 1, wherein the data carrier is selected from the group consisting of a telephone card and an identity card.

15. The data carrier according to claim 1, wherein the coating material comprises a UV curing lacquer including about 20% by weight of microcapsules.

16. The method of producing a data carrier including a substrate layer having a non-absorbent surface having microcapsules containing scents disposed on the non-absorbent surface of the data carrier in the area of a printed image provided on the data carrier, said scents contained in microcapsules fracturable by application of mechanical force applied thereto, comprising the steps of:

applying a coating containing at least one group of microcapsules containing a common scent to the non-absorbent surface in the form of a hardenable liquid containing the microcapsules and hardening the liquid with the microcapsules embedded therein in a manner such that at least some of the microcapsules are accessible at the surface of the hardened coating so as to be readily fracturable by mechanical force applied thereto for release of scent contained in the microcapsules.

17. A method of producing multiple data carriers including substrate layers having non-absorbent surfaces and having scent-containing microcapsules disposed on the non-absorbent surfaces of each data carrier in the area of a printed image provided on each data carrier, said scents releasable by fracturing of the microcapsules due to mechanical forces applied thereto, comprising the steps of:

providing the data carriers temporarily as portions of a single sheet constituting a substrate layer having a non-absorbent surface;

applying a coating containing at least one group of microcapsules containing a common scent to the non-absorbent surface in the form of a hardenable liquid and containing the scented microcapsules and hardening the coating in a manner such that the at least some of the microcapsules are accessible at the surface of the coating so as to be readily fracturable by mechanical force applied thereto for release of the scent contained therein; and separating individual data carriers in the form of individual substrates with the coating and microcapsules thereon from the single sheet.

* * * * *